United States Patent [19]

Kurita

[11] 4,412,035
[45] Oct. 25, 1983

[54] SILICONE EMULSION COMPOSITION

[75] Inventor: Akitsugu Kurita, Ohta, Japan

[73] Assignee: Toshiba Silicones Ltd., Tokyo, Japan

[21] Appl. No.: 381,488

[22] Filed: May 24, 1982

[51] Int. Cl.³ .......................... C08K 3/02; C08K 3/16; C08K 3/28
[52] U.S. Cl. .................................. 524/796; 524/838
[58] Field of Search ................................. 524/796, 838

[56] References Cited

U.S. PATENT DOCUMENTS 4,075,154  2/1978  Itoh et al. ............................ 524/796
4,177,176  12/1979  Burrill et al. ....................... 524/838
4,324,712  4/1982  Vaughn, Jr. ........................ 524/838

Primary Examiner—Joseph L. Schofer
Assistant Examiner—N. Sarofin

[57] ABSTRACT

The present invention relates to a silicone cationic emulsion composition of a polydioganosiloxane containing amino, epoxy, and hydroxyl groups as functional groups, and which may be used as a releasing agent, stripping agent, paint component, and anti-foaming agent.

5 Claims, No Drawings

SILICONE EMULSION COMPOSITION

DETAILED DESCRIPTION OF THE INVENTION

The present invention relates to a silicone emulsion composition. More particularly, the present invention relates to a cationic emulsion composition of a polydiorganosiloxane containing amino, epoxy and hydroxyl groups as functional groups.

The polyorganosiloxane emulsion compositions are used as a releasing agent, stripping agent, paint component, and anti-foam agent. In addition, they are used widely for the treatment of papers, fibers, and glasses.

An organopolysiloxane latex composition obtained by the emulsion polymerization of a cyclic organosiloxane in the presence of an organotrialkoxysilane containing an amino, epoxy, or mercapto group as a functional group coupling agent has been proposed as a one-package type emulsion composition having an excellent film-forming property (Japanese Patent Laid-Open No. 131661/1979). It has been reported that this composition is preferred particularly as a finishing agent for fibers or as a treating agent for papers and fibers. However, in case the organoalkoxysilane contains an amino group as the functional group and the amount thereof is large, a yellowing phenomenon occurs in the course of the heat treatment of the fibers or papers. Further, if the organotrialkoxysilane containing an amino or epoxy group as the functional group is used in a large relative amount, gelation occurs during the emulsion polymerization due to its strong hydrolyzability, and, in addition, the stability of the emulsion per se is deteriorated by an alcohol formed by the hydrolysis. On the other hand, if the relative amount of the organotrialkoxysilane having an amino group or the like as the functional group is insufficient and the ratio of the functional group to the total emulsion composition is insufficient, the adhesion of the composition to a base is reduced. If the amount of the organotrialkoxysilane is less than 1%, the effects thereof cannot be exhibited.

After intensive investigation made for the purpose of overcoming these defects of the conventional processes, the inventor has succeeded in obtaining a silicone emulsion composition free of the above defects by reacting a reaction product of an amino group-containing silane and an epoxy group-containing silane as a silane derivative with a silanol group-containing polydiorganosiloxane and emulsion-polymerizing the reaction product with a cyclic organosiloxane. The present invention has been completed on the basis of these findings.

An object of the present invention is to provide a silicone emulsion composition having excellent film-forming ability, adhesion, and stability and suitable for use particularly in the treatment of fibers and papers.

SUMMARY OF THE INVENTION

The composition of the present invention is a silicone emulsion composition obtained by emulsion-polymerizing:
(1) 0.1–60 weight percent of a reaction product of (A) 50–99.9 weight percent of a polydiorganosiloxane having at least one silanol group in the molecule and a viscosity at 25° C. of 5–10,000 cSt, and (B) 0.1–50 weight percent of a product obtained by reacting (a) 1 mole of an amino group-containing silane with (b) 0.5–3.0 mole of an epoxy group-containing silane, with (2) 1–50 weight percent of a cyclic organosiloxane in the presence of:
(3) 0.1–20 weight percent of a quaternary ammonium salt surfactant, and
(4) 20–90 weight percent of water.

DESCRIPTION OF THE INVENTION

The polydiorganosiloxane (A) used as the starting material of the reaction product (1) constituting the composition of the present invention has at least one silanol group in the molecule and a viscosity at 25° C. of 5–10,000 cSt, preferably 50–1,000 cSt. If the polydiorganosiloxane has a viscosity at 25° C. of less than 5 cSt, i.e. a low molecular weight, the silanol group content becomes too large and a reaction product thereof with (B) has reduced stability. For the same reasons as above, the stability of a reaction product thereof with (B) is reduced a little also when the viscosity is less than 50L cSt. On the other hand, if the viscosity is higher than 1,000 cSt, a reaction product thereof with (B) has an excessive viscosity, and the emulsification thereof becomes difficult. If the viscosity is higher than 10,000 cSt this phenomenon becomes remarkable, and the relative amount of (B) in the composition is reduced due to the reduction in amount of the terminal silanol group and also due to compound (2) required in a large amount for reducing the viscosity of the system, whereby the intended excellent film cannot be obtained.

As the organic group bonded with the silicon atom in the polydiorganosiloxane (A), there may be mentioned, for example, an alkyl group such as methyl, ethyl, butyl, hexyl, decyl or dodecyl group, an aralkyl group such as beta-phenylethyl or beta-phenylpropyl group, phenyl group or vinyl group. From the viewpoint of ease of the synthesis of the polydiorganosiloxane, a methyl or phenyl group is preferred, and among them, methyl is particularly preferred. The polydiorganosiloxane (A) contains at least one silanol group in the molecule. Preferably the polydiorganosiloxane is blocked with silanol groups at both terminals thereof. As particular examples of (A) there may be mentioned a polydimethylsiloxane blocked with silanol group at one terminal and trimethylsilyl group at the other; polydimethylsiloxane blocked with silanol groups at both terminals; and polymethylphenylsiloxane blocked with silanol groups at both terminals.

The component (B) used as the other starting material of component (1) is a reaction product of components (a) and (b). The component (a) is an amino group-containing silane of formula (I):

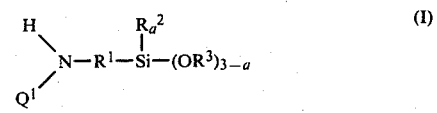

wherein $Q^1$ represents a monovalent group selected from the group consisting of hydrogen atom, $-CH_3$, $-CH_2CH_2NH_2$ and $-CH_2CH_2NHCH_2CH_2NH_2$, $R^1$ represents a divalent hydrocarbon group having 1–4 carbon atoms, $R^2$ and $R^3$ each represent a monovalent hydrocarbon group having 1–4 carbon atoms and $a$ represents an integer of 0 or 1. As the divalent hydrocarbon group $R^1$ having 1–4 carbon atoms in the above formula (I), there may be mentioned, for example, methylene, ethylene, propylene or butylene. As the monovalent hydrocarbon group $R^2$ or $R^3$ having 1–4 carbon atoms, there may be mentioned, for example, methyl, ethyl, n-propyl, isopropyl, n-butyl or isobutyl. As the amino group-containing silane, there may be mentioned, for example, gamma-aminopropyltriethoxysilane, gamma-aminopropylmethyldiethoxysilane, N-(beta-aminoethyl)aminomethyltrimethoxysilane, gamma-[N-(beta-aminoethyl)amino]propyltrimethoxyysilane, gamma-[N-(beta-aminoethyl)amino] propylmethyldimethoxysilane, N-(beta-aminoethyl)aminoethyltributoxysilane or gamma-[N-(beta-(N-beta-aminoethyl-)amino)ethyl)amino] propyltrimethoxysilane.

The component (b) is an epoxy group-containing silane of formula (II):

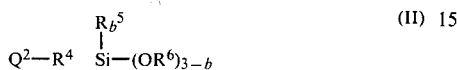

wherein $Q^2$ represents an epoxy group-containing group selected from the group consisting of glycidoxy and epoxycyclohexyl groups, $R^4$ represents a divalent hydrocarbon group having 2–4 carbon atoms, $R^5$ and $R^6$ each represent a monovalent hydrocarbon group having 1–4 carbon atoms and b represents an integer of 0 or 1. As the divalent hydrocarbon group $R^4$ having 2–4 carbon atoms in the above formula (II), there may be mentioned, for example, ethylene, propylene or butylene. As the monovalent hydrocarbon group $R^5$ or $R^6$ having 1–4 carbon atoms, there may be mentioned, for example, methyl, ethyl, n-propyl, isopropyl, n-butyl or isobutyl.

As particular examples of the epoxy group-containing silanes, there may be mentioned gamma-glycidoxypropyltrimethoxysilane, gamma-glycidoxypropylmethyldimethoxysilane, beta-(3,4-epoxycyclohexyl)ethyltrimethoxysilane, beta-(3,4-epoxycyclohexyl)ethylmethyldimethoxysilane, beta-(3,4-epoxycyclohexyl)ethyltriethoxysilane, and beta(3,4-epoxycyclohexyl)ethylmethyldiethoxysilane.

The component (B) is prepared by reacting 1 mole of component (a) with 0.5–3.0 mole, preferably 0.75–1.5 mole, of component (b). The reaction is carried out generally by mixing components (a) and (b) and heating the mixture to 20°–80° C. under stirring. The reaction product of components (a) and (b) may contain a small amount of unreacted components. If the component (b) is used in an amount of less than 0.5 mole or more than 3.0 mole per mole of the component (a), the amount of one of the silane compounds to be reacted becomes insufficient and, therefore, the reaction mixture formed by the reaction of (a) and (b) contains only a reduced amount of the reaction product having a high functional group content, whereby the desired cross-linked structure cannot be obtained.

The component (1) is obtained by reacting the above-mentioned components (A) and (B) by an ordinary method. The components (A) and (B) are used in a proportion of 50–99.9 weight percent to 0.1–50 weight percent respectively to (1). If the amount of component (B) is less than 0.1 weight percent to (1), adhesive film does not form. If the amount of component (B) exceeds 50 weight percent to (1), the reaction product of (A) and (B) has a low stability and it gels in the course of the reaction in some cases. As for the reaction conditions, for example, the components (A) and (B) are charged in a reactor, and the reaction is carried out at 40°–60° C. in nitrogen stream for 1–5 hours.

The amount of component (1) to the composition is 0.1–60 weight percent, preferably 1–30 weight percent.

If the amount of component (1) is less than 0.1 weight percent, film which has excellent adhesion properties does not form. And if the amount of component (1) exceeds 60 weight percent, the composition cannot be easily emulsified.

The component (2) used as another starting material of the composition of the present invention is a cyclic organosiloxane of formula (III):

wherein $R^7$ and $R^8$ may be the same or different, and each represent a substituted or unsubstituted hydrocarbon group having 1–50 carbon atoms and n represents an integer of at least 3. As groups $R^7$ and $R^8$, there may be mentioned, for example, straight or branched alkyl groups (such as methyl, ethyl, hexyl, octyl, decyl, hexadecyl and octadecyl groups); alkenyl or dienyl groups (such as vinyl, allyl and butadienyl groups); aryl groups (such as phenyl, naphthyl and xenyl groups); and aralkyl groups (such as benzyl, beta-phenylethyl, methylbenzyl and naphthylmethyl groups). As the substituent of the hydrocarbon group, there may be mentioned a halogen atom such as fluorine or chlorine or cyano group.

The amount of component (2) to the composition is 1–50 weight percent, preferably 5–30 weight percent. If the amount of component (2) is less than 1 weight percent or more than 50 weight percent, the composition cannot be easily emulsified, and an emulsion after polymerization is not stable. From the viewpoint of stability of emulsion, total amount of components (1) and (2) is preferably 20–60 weight percent of the composition.

As the quaternary ammonium salt surfactant (3) used in the production of the composition of the present invention, there may be mentioned, for example, an alkyltrimethylammonium salt such as octadecyltrimethylammonium chloride or hexadecyltrimethylammonium chloride; a dialkyldimethylammonium salt such as dioctadecyldimethylammonium chloride, dihexadecyldimethylammonium chloride or didodecyldimethylammonium chloride and a benzalkonium chloride such as octadecyldimethylbenzylammonium chloride or hexadecyldimethylbenzylammonium chloride.

The amount of component (3) in the composition is 0.1–20 weight percent, preferably 0.5–8 weight percent. If the amount of the component (3) is out of this range, a good emulsified state cannot be obtained.

The amount of component (4), water, in the composition is 20–90 weight percent, preferably 40–80 weight percent. If the amount is out of this range, a stable emulsion cannot be formed.

The composition of the present invention is obtained by mixing the components (1), (2), (3), and (4) together to obtain a rough dispersion, emulsifying them by means of an emulsifying machine such as a colloid mill or a homogenizer to obtain a homogeneous emulsion and subjecting the same to the emulsion polymerization under heating with stirring. The emulsion polymerization reaction is usually preferably carried out in the presence of an emulsion polymerization catalyst. It is particularly preferred to use potassium hydroxide as the emulsion polymerization catalyst. An excellent composition can be obtained by incorporating a nonionic surfactant in the reaction system in addition to the above-mentioned cationic surfactant. As the nonionic surfactant, there may be mentioned, for example, a glycerol fatty acid ester, sorbitan fatty acid ester, polyoxyethylene (hereinafter referred to as POE) alcohol ether, POE sorbitan fatty acid ester, POE glycelol fatty acid ester, POE alkylphenol ether or POE polyoxypropylene block copolymer. The emulsion polymerization reaction is carried out generally at 30°–90° C., preferably at 60°–80° C.

In case the composition of the present invention is used as a fiber treating agent, the treatment is effected as follows: a cloth is immersed in a solution of the composition in water, the cloth is squeezed, dried at a given temperature for a given period of time, and, if necessary, heat-treated.

As will be proved in the following examples, in comparison with the comparative examples, the composition of the present invention thus obtained has excellent film-forming ability, adhesion, and stability. This silicone emulsion composition is suitable for use as a treating agent for fibers and papers since it does not cause any yellowing of them.

The following examples and comparative examples will further illustrate the present invention, which by no means limit the invention. In the examples and comparative examples, parts means weight parts.

EXAMPLE 1

10 parts of a reaction product of equimolar amounts of gamma-(N-beta-aminoethylamino)propyltrimethoxysilane and beta-(3,4-epoxycyclohexyl)ethyltriethoxysilane were reacted with 90 parts of polydimethylsiloxane blocked with silanol groups at both terminals and having a viscosity at 25° C. of 200 cSt at 80° C. for 3 hours to obtain a colorless, transparent base oil A.

8 parts of base oil A, 27 parts of octamethylcyclotetrasiloxane, 5 parts of dioctadecyldimethylammonium chloride, 59.5 parts of water, and 0.5 part of potassium hydroxide were stirred together to obtain a mixture. The mixture was emulsified by passing them through a colloid mill having a mill distance of 10 mil. The resulting product was stirred under heating to 75° C. for 3 hours. After cooling to 40° C. under stirring, it was neutralized with hydrochloric acid to obtain composition A-1.

EXAMPLE 2

15 parts of a reaction product of equimolar amounts of gamma-aminopropyltriethoxysilane and gamma-glycidoxypropylmethyldimethoxysilane were reacted with 85 parts of polydimethylsiloxane blocked with silanol groups at both terminals and having a viscosity at 25° C. of 100 cSt at 80° C. for 5 hours to obtain a colorless, transparent base oil B. 15 parts of the base oil B, 20 parts of octamethylcyclotetrasiloxane, 5 parts of dihexadecyldimethylammonium chloride, 59.5 parts of water and 0.5 part of potassium hydroxide were stirred together and composition B-1 was obtained in the same manner as in Example 1. 3 parts of sorbitan monolaurate was added to 100 parts of composition B-1, and the mixture was stirred at room temperature to obtain composition B-2.

EXAMPLE 3

10 parts of a reaction product of equimolar amounts of gamma-aminopropyltriethoxysilane and beta-(3,4-epoxycyclohexyl)ethyltriethoxysilane were reacted with 90 parts of polydimethyldiphenylsiloxane blocked with silanol groups at both terminals, comprising 10 mole % of diphenylsiloxy units and 90 mole % of dimethylsiloxy units and having a viscosity at 25° C. of 500 cSt at 80° C. for 3 hours to obtain a colorless, transparent base oil C.

10 parts of the base oil C, 25 parts of a mixture of 72 weight percent of octamethylcyclotetrasiloxane and 28 weight percent of decamethylcyclopentasiloxane, 4 parts of dihexadecyldimethylammonium chloride, 60.5 parts of water, and 0.5 part of potassium hydroxide were stirred together to obtain a mixture. The mixture was emulsified by passing them through a colloid mill having a mill distance of 10 mil. The resulting product was stirred under heating to 70° C. for 4 hours. After cooling to 40° C. under stirring, it was neutralized with hydrochloric acid to obtain composition C-1.

COMPARATIVE EXAMPLE 1

2 parts of gamma-(N-beta-aminoethylamino)propyltrimethoxysilane was mixed with 31 parts of octamethylcyclotetrasiloxane. 59.5 parts of water was mixed with 7 parts of dihexadecyldimethylammonium chloride to obtain a solution. The above-prepared silane-siloxane mixture was added dropwise to the solution, and the whole was stirred. 0.5 part of potassium hydroxide was added to the mixture. Passing them through a colloid mill (mill distance: 10 mil), an emulsion was obtained, and then, the emulsion was stirred under heating to 75° C. for 3 hours. After cooling to 40° C. under stirring, it was neutralized with hydrochloric acid to obtain composition D.

COMPARATIVE EXAMPLE 2

Composition E was prepared from 4 parts of gamma-aminopropyltriethoxysilane and 29 parts of octamethylcyclotetrasiloxane in the same manner as in Comparative Example 1.

Compositions A-1, B-1, B-2, C-1, D and E obtained in the above examples and comparative examples were used for the treatment of cloths to obtain experimental data as shown in the following table. Effects of the compositions as fiber-treating agents were evaluated using cloths treated under the following treatment conditions:

Treating bath: Each composition diluted with water to 1/30 concentration
Cloth: Knitted cotton cloth
Treating method: The cloth once immersed in the bath was squeezed (squeezing rate: 100%), dried at 120° C. for 5 minutes and heat-treated at 180° C. for 11 minutes.

| Composition Test | Resilience | Slipperiness | Yellowing | Color Fastness |
|---|---|---|---|---|
| A-1 | Good | Slight | Not caused | 5-4 Grade |
| B-1 | Good | None | Not caused | 5-4 Grade |
| B-2 | Good | None | Not caused | 4-5 Grade |
| C-1 | Good | None | Not caused | 4-5 Grade |

| Composition Test | Resilience | Slipperiness | Yellowing | Color Fastness |
| --- | --- | --- | --- | --- |
| D | Good | None | Slight yellowing | 4 Grade |
| E | Good | None | Yellowing | 3 Grade |

Test method according to JIS L 0849. Resilience and slipperiness were examined by means of fingers and yellowing was judged by visual observation.

The compositions obtained in Examples 1 to 3 did not cause the yellowing of the material and exerted no bad influence on the color fastness.

I claim:

1. A silicone emulsion composition obtained by emulsion-polymerizing:

(1) 0.1–60 weight percent of a reaction product of:

(A) 50–99.9 weight percent of a polydiorganosiloxane having at least one silanol group in the molecule and a viscosity at 25° C. of 5–10,000 cSt, and (B) 0.1–50 weight percent of a product obtained by reacting:

(a) 1 mole of a compound of the formula:

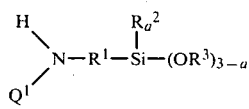

wherein $Q^1$ represents a monovalent group selected from the group consisting of hydrogen atom, $-CH_3$, $-CH_2CH_2NH_2$ and $-CH_2CH_2NHCH_2CH_2NH_2$, $R^1$ represents a divalent hydrocarbon group having 1–4 carbon atoms, $R^2$ and $R^3$ each represent a monovalent hydrocarbon group having 1–4 carbon atoms and a represents an integer of 0 or 1, with (b) 0.5–3.0 mole of a compound of the formula:

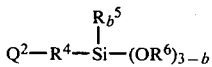

wherein $Q^2$ represents an epoxy group-containing group selected from the group consisting of glycidoxy and epoxycyclohexyl groups, $R^4$ represents a divalent hydrocarbon group having 2–4 carbon atoms, $R^5$ and $R^6$ each represent a monovalent hydrocarbon group having 1–4 carbon atoms and b represents an integer of 0 or 1, with (2) 1–50 weight percent of a compound of the formula:

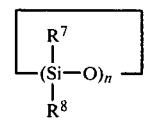

wherein $R^7$ and $R^8$ may be the same or different and each represent a substituted or unsubstituted hydrocarbon group having 1–50 carbon atoms and n represents an integer of at least 3, in the presence of:

(3) 0.1–20 weight percent of a quaternary ammonium salt surfactant, and (4) 20–90 weight percent of water.

2. A composition according to claim 1 wherein the polydiorganosiloxane is blocked with silanol groups at both terminals.

3. A composition according to claim 1 wherein the polyorganosiloxane has a viscosity at 25° C. of 50–1,000 cSt.

4. A composition according to claim 1 wherein the emulsion polymerization is carried out in the further presence of a nonionic surfactant.

5. A composition according to claim 1 wherein the emulsion polymerization is carried out using potassium hydroxide as the catalyst.

* * * * *